United States Patent

[11] 3,548,072

| [72] | Inventor | Gabriele Maschio<br>Southampton, England |
|---|---|---|
| [21] | Appl. No. | 719,982 |
| [22] | Filed | Apr. 9, 1968 |
| [45] | Patented | Dec. 15, 1970 |
| [73] | Assignee | Pirelli, S.p.A.<br>Milan, Italy<br>a corporation of Italy |
| [32] | Priority | Apr. 14, 1967 |
| [33] | | Italy |
| [31] | | No. 14949A/67 |

[54] DEVICE AND METHOD FOR REDUCING OVERHEATING IN OIL-FILLED ELECTRIC CABLES
8 Claims, 3 Drawing Figs.

[52] U.S. Cl. .................................................. 174/15;
165/87, 165/184
[51] Int. Cl. ...................................................... H01b 7/34

[50] Field of Search............................................ 174/11, 10,
14, 15, 15C; 165/39—40, 87, 177, 179, 184;
138/38, 33

[56] References Cited
UNITED STATES PATENTS

| 3,378,453 | 4/1968 | Gorker.......................... | 138/38X |
| 3,071,159 | 1/1963 | Coraggioso.................. | 138/38 |
| 3,111,551 | 11/1963 | D'Ascou...................... | 174/15 |
| 1,833,876 | 11/1931 | McGrath...................... | 138/38X |
| 3,086,372 | 4/1963 | Barger et al. ................ | 165/179X |
| 2,549,687 | 4/1951 | Jack et al...................... | 165/87X |

*Primary Examiner*—Laramie E. Askin
*Assistant Examiner*—A. T. Grimley
*Attorney*—Ward, Mc Elhannon, Brooks & Fitzpatrick

ABSTRACT: Localized overheating in electric cables in which oil flows through a duct in the conductor of the cables is reduced by increasing the speed of oil flow within the duct at the areas prone to such overheating.

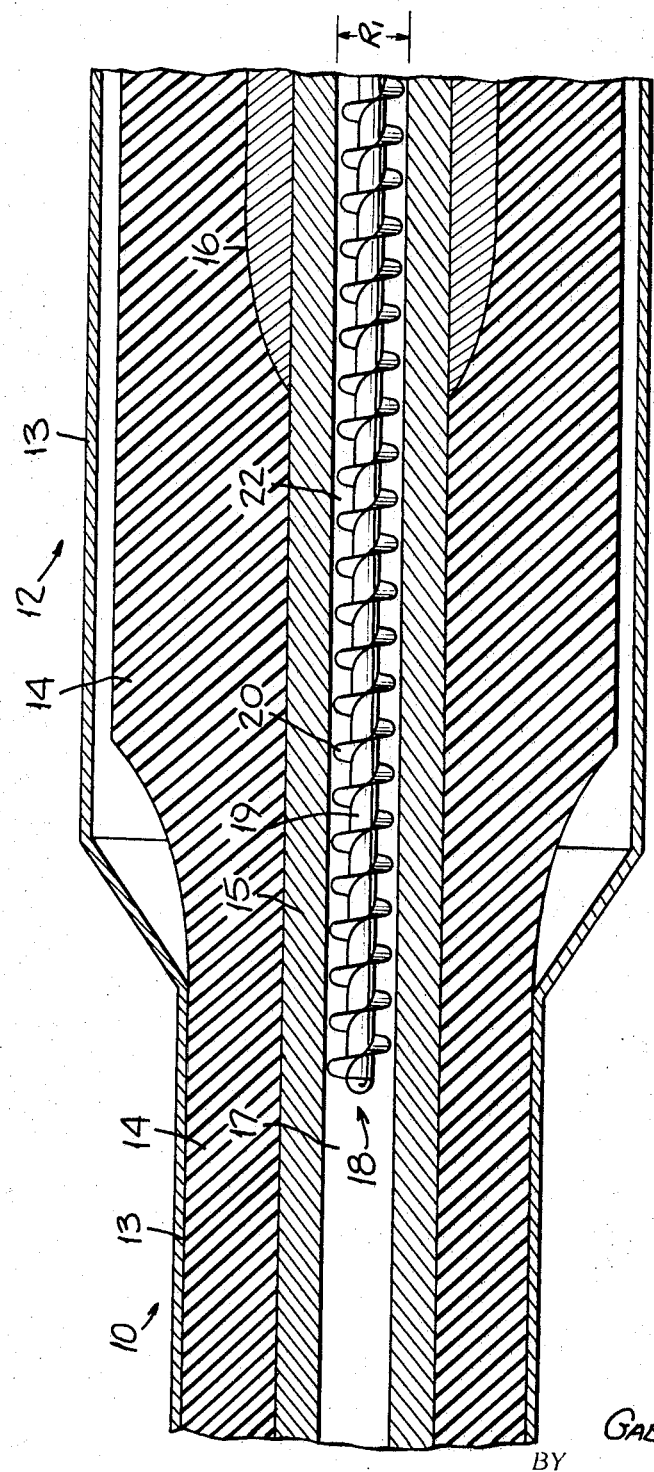

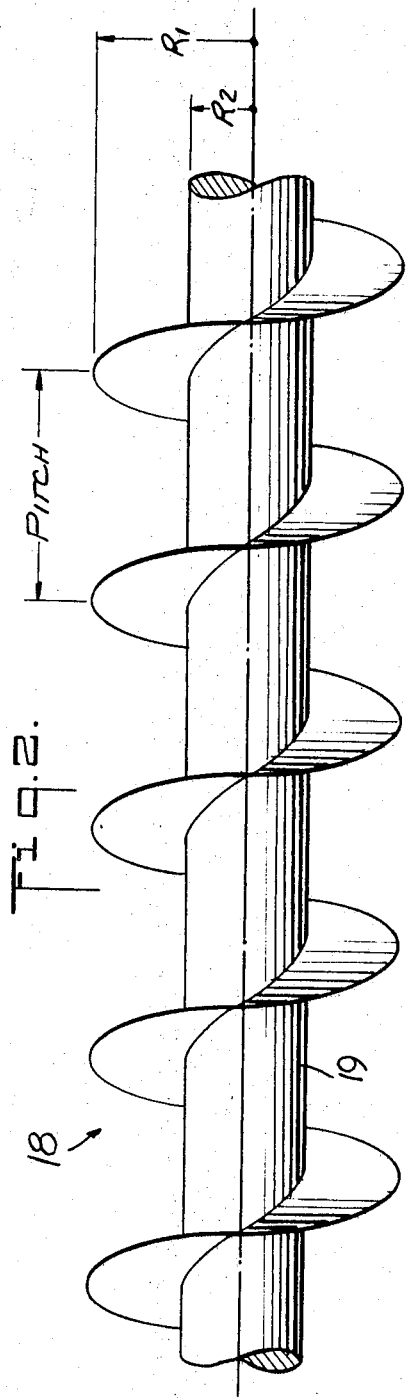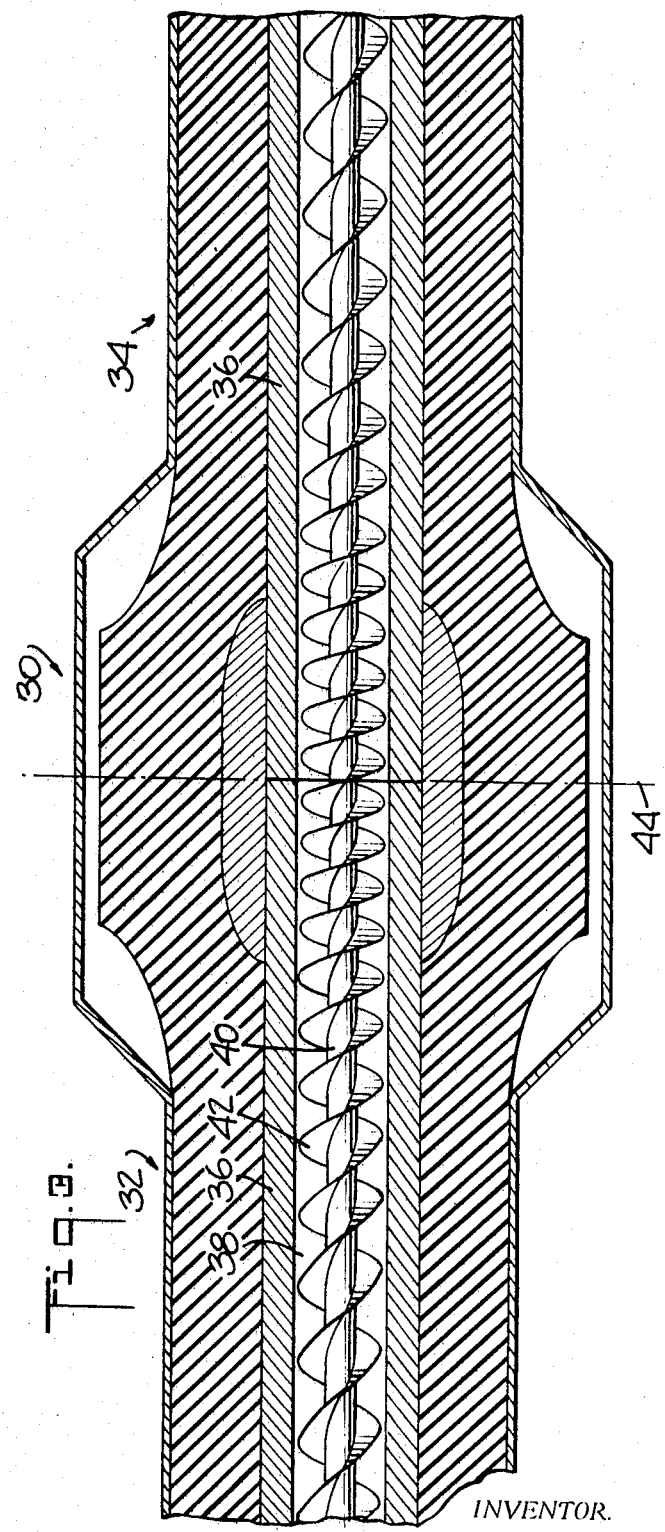

DEVICE AND METHOD FOR REDUCING OVERHEATING IN OIL-FILLED ELECTRIC CABLES

This invention relates to the reduction of overheating in fluid cooled devices and more particularly it concerns the prevention of concentrated or localized overheating in such devices by equalizing temperature therealong.

The present invention is particularly useful in connection with the cooling of oil-filled electric cables. These cables are subject to localized heating at various points such as the sealing ends and joints thereof. This results both from increases in the electrical resistance of the cable conductor in these regions and from increases in the thermal resistance of the cable insulation in these regions.

In designing an electrical cable, its size is chosen such that the temperature of its conductor in the regions of highest heat concentration will not exceed a maximum permissible value, e.g., 85°—90° C. for oil-filled cables. This temperature can be calculated for a given current load by taking into account the "Joule effect" for electrical temperature increases, and by taking into account the thermal resistance of the surrounding cable insulation.

It has long been desired to obtain a substantial reduction or an actual elimination of localized temperature concentrations in electrical cables, since this would permit the cable to carry a far larger electrical current load without increasing its size, thereby making it possible to more fully exploit the maximum capacity of the cable.

In order to cool single-core oil-filled electrical cables, which contain an oil-filled duct therealong, it had previously been proposed to circulate the oil along the duct, thereby making the temperature along the length of the cable more nearly uniform. Now, the proposed oil flow velocity was quite low and, in fact, was of the same order as that which results in normal oil-filled electrical cables when the oil is circulated by the thermal transients which occur along the cable during operation. The reason for the low oil flow velocities was to ensure a regular or laminar flow condition. Such condition is characterized by a low Reynolds number. When the flow velocity reaches a certain value the flow becomes turbulent. This is undesirable since it results in excessive pressure-head losses along the cable. This in turn requires completely different hydraulic characteristics within the cable and raises its cost considerably.

In spite of the above, the use of laminar fluid flow has the drawback of a poor heat transfer characteristic, i.e., a high thermal resistance, between the cable conductor and the cooling oil. Actually, the convection coefficient of heat transfer ($\alpha$) between the cable conductor and the cooling oil, is closely related to the Reynolds number which the oil possesses as it flows along the conductor. Thus where the Reynolds number is smaller, the convection coefficient ($\alpha$) is also smaller; and so is the overall rate of heat transfer. Even though this overall rate of heat transfer may suffice for the more uniform portions of the cable, it is often insufficient to prevent overheating in local regions of rapid heat generation.

The present invention makes it possible to reduce localized overheating in oil-filled electrical cables by taking advantage of the higher heat transfer characteristics which accompany high oil flow velocities and high Reynolds numbers. This is achieved moreover without the aforementioned disadvantages of turbulent oil flow.

According to the present invention there is provided a device which reduces localized overheating in oil-filled electrical cables by producing localized variations in the character of flow of the oil within the cable in those regions or zones which are prone to overheating. This localized change in oil flow is such as to increase the coefficient of heat transfer between the cable conductor and the oil in these regions. More specifically the flow velocity of the oil is increased within the cable oil duct at the region prone to overheating and this is done in such a manner as to avoid any change, in this region, of the surface area across which heat transfer takes place between the cable conductor and the oil.

Means are provided for achieving this increase in oil flow velocity. This means may comprise arrangements for reducing the cross-sectional area of the cable oil duct. On the other hand, where even more efficient cooling is desired the oil flow control means may comprise arrangements for increasing the longitudinal distance of oil flow across the zone to be cooled in addition to reducing the cross-sectional area of the oil flow duct in this zone.

In one embodiment of the present invention, the oil flow control means is constituted by a small shaft whose diameter is less than that of the cable oil duct; and this shaft is mounted inside the duct coaxially therewith in a zone to be cooled.

In a presently preferred embodiment, the oil flow control means is constituted by a small shaft arranged as aforementioned and further by a cylindrical helix disposed about at least a portion of the shaft. The outer diameter of the helix is equal to that of the duct; and it cooperates with the duct to define a helical channel between the shaft and the inner surface of the duct. The pitch of the helix and the diameter of the shaft may be chosen to provide the Reynolds number needed for the desired heat transfer in the zone being cooled.

The specific embodiments of the invention have been chosen for purposes of illustration and description, and are shown in the accompanying drawings forming a part of the specification, wherein:

FIG. 1 is a longitudinal section view of one-half of a "through joint" of the symmetrical type for single-core oil-filled cables in which the present invention is utilized;

FIG. 2 is a detail of an oil flow controlling device used in the joint of FIG. 1; and FIG. 3 is a longitudinal section view of an entire through joint in which another version of the present invention is embodied.

In FIG. 1 there is shown an end portion of an oil-filled single-core electrical cable 10. A "through joint" 12, is secured to the end of the cable 10.

The cable 10 and the joint 12 are both covered with a metal sheath 13 which, for simplicity's sake, is illustrated as a continuous element.

An insulation 14 is provided inside the metal sheath 13 of both the cable 10 and the joint 12. The insulation 14 covers a central cable conductor 15. The conductor 15, is connected by means of a clamp 16, to a corresponding conductor (not shown) of another section of cable leading into the opposite side of the joint 12.

The conductor 15 is hollow and is formed with a central internal duct 17 of a circular cross section. Impregnating oil for the cable fills the duct 17 and flows along its length.

An oil flow control device 18 extends inside the duct 17 in the region or zone of the through joint 12. The device 18 is shown in enlarged detail in FIG. 2.

The flow control device 18 comprises a small shaft 19 having a diameter less than that of the duct 17. A cylindrical helix 20 of uniform pitch and having an outer diameter equal to the diameter of the duct 17 is disposed on the shaft 19.

The thickness of the helix 20, at least in the region of its outer periphery, is very small so that it covers only a very small portion of the inner surface of the duct 17. The turns of the helix 20 define a channel 22, which follows a helical path around the shaft 19. The channel 22 moreover is in contact with the entire surface of the portion of the duct containing the helix 20.

The overall rate of oil flow through the duct 17 is maintained at a constant value. However, in the zones subjected to overheating, such as the zone occupied by the through joint 12, the oil is caused by the device 18 to travel along a helical path and at an average flow velocity which is much higher than that it has in the other regions of the duct 17, since the cross section of the channel 22 is less than that of the cable duct 17 itself.

The reduction of the cross-sectional area of the oil flow path results in a reduction of its wet perimeter $c$ and consequently, since the overall rate of flow remains unchanged, there is produced an increase in the Reynolds number of the flowing oil.

This increase in Reynolds number occasions an increase in the convection coefficient ($\alpha$) of heat transfer between the conductor 15 and the oil in the duct 17; and this in turn increases the overall coefficient of heat transfer. As a result there is obtained an increased dissipation of heat for a given thermal variation, or conversely, there is obtained a reduction of the thermal variation for a given amount of dissipated heat, since the region over which heat exchange takes place between conductor and oil remains practically unchanged. The rate of heat transfer C may be expressed by the following equation:

$$C = K\, S \Delta T$$

where

K is the total coefficient of heat transfer;

S is the surface area across which heat transfer takes place; and $\Delta T$ is the temperature differential between the conductor and the oil.

Even though the heat transfer surface area and the rate of heat generation in the conductor remain the same, the temperature rise of the conductor is reduced by virtue of the present invention.

The Reynolds number Re for fluid flow through a given channel may be expressed by the formula:

$$Re = \frac{4Q}{c,V}$$

where

Q is the mass rate of flow along the channel;

c is the perimeter of the wet section of the channel; and

V is the kinematic viscosity of the oil.

Now Q and V remain constant within the duct 17 and in the channel 22, so that the ratio between the Reynolds number in the duct and the Reynolds number in the channel will be inversely proportional to the wet perimeters of these two regions. Using the subscripts 1 and 2, respectively, for the duct and for the channel, the following equation is obtained:

$$\frac{Re_2}{Re_1} = \frac{c_1}{c_2}$$

Now if, for example, the duct 17 of the conductor 15 has a diameter of 1.2 cm. and $Re_1$ is about 1,000 (for a typical situation); then in order to obtain $Re_2$ to have a value higher than 2,500, the following equation will be obtained:

$$c_2 < \frac{c_1}{2.5} = \frac{3.78}{2.5} = 1.52 \text{ cm.}$$

The term $c_2$ is expressed by the formula:

$$c_2 = 2(p + R_1 - R_2)$$

where p is the pitch of the helix 20;

$R_1$ is the radius of the duct 17; and $R_2$ is the radius of the small shaft 19.

In the present case, it has been possible to eliminate overheating in the joint illustrated by building up a device in which the radius of the small shaft 19 is 0.4 cm. and the pitch of the helix 20 is 0.5 cm. Therefore, the flow characteristic of the oil, and consequently its particular Reynolds number, can be varied at will by varying the pitch of the helix and the diameter of the small shaft.

The length of the helix 20 should be calculated in such a way as to prolong appropriately the zone of turbulent flow in order to obtain an efficient reduction of overheating.

Following its exit from the joint, the oil, after a short transitional travel reverts back to a flow condition in accordance with the duct characteristics; that is it attains a regular flow condition.

As indicated above, the advantage afforded by a device according to the present invention is that a considerable increase in the efficiency of the heat exchange between the conductor and the oil is achieved. At the same time, the length of the region of turbulent oil flow is kept quite short so as to minimize any pressure head losses. Thus the head losses caused by the turbulent flow in the joints are negligible in comparison with the overall cable losses, especially in the case of normal cables which generally have a length of several kilometers.

Turning now to FIG. 3 there is shown an overall view of a through joint 30 for joining together two cable sections 32 and 34. Each cable section includes a central conductor 36 formed with a central oil passage duct 38. Each duct 38 also is provided with a central shaft 40 on which is formed a cylindrical helix 42 as above described. It will be seen that when the cable sections 32 and 34 are brought together at a common joining line 44 within the joint 30, the two shafts 40 and the two helices 42 form continuations of each other so as to obtain a continuation of turbulent or high velocity oil flow in the central region of the joint.

It will also be noted in FIG. 3 that the pitch of the helices 42 varies from the ends to the center of the joint. In this manner the oil flow may be made to conform to the cooling requirements as they differ in different regions of the joint.

It will be appreciated that the present invention achieves reduction of localized overheating by locally increasing the velocity and/or nature of flow of the cooling oil along the cables.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

I claim:

1. In an electric power system including a length of cable having a central conductor with an oil duct therein extending the length thereof and having at least one section therealong which is short relative to the cable length and which heats to a temperature higher than other sections of the cable during the flow of current along said conductor, said conductor and said duct extending through said section, and including means for supplying oil to said duct and causing it to flow therealong both in advance of and through said section, the combination therewith of means for increasing the speed of oil flow through the duct in said section relative to the speed thereof in advance thereof, comprising a shaft mounted in said duct within said section and extending substantially for the length of said section, said shaft having a peripheral dimension less than the inner peripheral dimension of said duct and being mounted with its peripheral surface spaced from the inner peripheral surface of said duct to provide a passageway between said shaft and the inner wall of said duct of a size smaller than said duct and through which said oil flows in contact with said wall from one end of said section to the other, the area of contact between said oil and said wall in said section being substantially the same as it is in advance of said section, whereby the coefficient of heat transmission between said oil and said conductor is increased and the temperature of said section is reduced relative to the temperature thereof in the absence of said shaft.

2. The combination as set forth in claim 1 wherein said duct and said shaft are cylindrical and said shaft is mounted coaxially within said duct.

3. The combination as set forth in claim 1 further comprising a helix mounted around said shaft forming a helical channel between said shaft and said wall.

4. The combination as set forth in claim 3 wherein the outer periphery of said helix contacts said wall.

5. The combination as set forth in claim 1 wherein the dimensions of said shaft in relation to the dimensions of said duct are selected to provide a Reynolds' number for the oil flow greater than 2,500.

6. The combination as set forth in claim 1 wherein said section is a through joint for said cable, portions of said cable extending on opposite sides of said joint and being joined at said joint with their ducts interconnecting within said joint.

7. A device for reducing overheating in localized zones in electric cable of the type in which the oil flows through a duct in the conductor of the cable, said device comprising in combination with a single-core oil-filled electric cable having a duct in the conductor of said cable, oil flow control means for increasing the speed of said oil flow within said duct at preselected localized zones, said means being of a configuration to maintain substantially the same area of contact between said oil and said conductor in said zones, thereby increasing the coefficient of heat transmission between said oil and said conductor, said control means including means defining a helix within said duct along said preselected localized zones, said helix being of a configuration to cause said oil to flow in a helical path through said zone and having a pitch which varies along its length.

8. In a electric power system including a cable having a central conductor with an oil duct therein extending the length thereof and having a layer of insulation around said conductor, said cable having a pair of portions thereof joined together with their ducts in alignment, with their conductors electrically joined and with the joined conductors surrounded at their ends by insulation of a thickness greater than the thickness of said layer of insulation, and including means for supplying oil to one end of said duct and removing it from the other end thereof thereby causing it to flow therealong and through the portion thereof within said joint, the combination therewith of means for increasing the speed of oil flow, and reducing the temperature of the conductor, within said joint comprising a shaft having a cross section smaller than that of said duct centrally located within the portion of said duct within said joint and having a length substantially equal to the length of said joint and a helix disposed about at least a portion of said shaft between said shaft and the inner surface of said duct thereby forming a helical channel between said shaft and the inner surface of said conductor, said shaft extending within the duct of both said portions of said cable.